United States Patent
Ryley et al.

(10) Patent No.: US 7,062,291 B2
(45) Date of Patent: *Jun. 13, 2006

(54) WIRELESS MULTI-HANDSET TELEPHONE SYSTEM WITH INTEGRATED VIDEO MONITORING ACCESSORIES

(75) Inventors: Gordon Ryley, Calgary (CA); Ralph Tischler, Surrey (CA); Allan Chi-Yun Wong, Kowloon (HK)

(73) Assignee: VTech Telecommunications Limited (HK)

( * ) Notice: Subject to any disclaimer, the term of this patent is extended or adjusted under 35 U.S.C. 154(b) by 409 days.

This patent is subject to a terminal disclaimer.

(21) Appl. No.: 10/401,539

(22) Filed: Mar. 31, 2003

(65) Prior Publication Data

US 2004/0132489 A1  Jul. 8, 2004

Related U.S. Application Data

(60) Provisional application No. 60/437,998, filed on Jan. 6, 2003.

(51) Int. Cl.
*H04B 1/38* (2006.01)
*H04M 1/00* (2006.01)
*H04Q 7/20* (2006.01)

(52) U.S. Cl. .................... 455/556.1; 455/462
(58) Field of Classification Search ............ 455/556.1, 455/550.1, 462, 566; 340/539.1, 539.11; 348/155
See application file for complete search history.

(56) References Cited

U.S. PATENT DOCUMENTS

| | | | |
|---|---|---|---|
| 5,428,388 A | 6/1995 | von Bauer et al. | |
| 5,930,719 A * | 7/1999 | Babitch et al. | 455/462 |
| 6,192,257 B1 * | 2/2001 | Ray | 455/566 |
| 6,433,683 B1 | 8/2002 | Robinson | |
| 6,476,858 B1 | 11/2002 | Ramirez Diaz et al. | |
| 6,633,231 B1 * | 10/2003 | Okamoto et al. | 340/539.11 |
| 2001/0041586 A1 * | 11/2001 | Irube et al. | 455/556 |
| 2002/0160779 A1 * | 10/2002 | Arazi et al. | 455/444 |
| 2003/0092453 A1 * | 5/2003 | Mills et al. | 455/463 |
| 2003/0176197 A1 * | 9/2003 | Chen et al. | 455/462 |

FOREIGN PATENT DOCUMENTS

| | | |
|---|---|---|
| DE | 100 39 263 | 2/2002 |
| ES | 2133125 | 8/1999 |
| GB | 2 386 296 | 9/2003 |
| JP | 11004480 | 1/1999 |
| JP | 2000 115386 | 4/2000 |
| JP | 2000 165853 | 6/2000 |
| JP | 2002 152392 | 5/2002 |
| JP | 2002 354137 | 12/2002 |
| WO | WO 03/096696 | 11/2003 |

OTHER PUBLICATIONS

GB Search Report dated.

* cited by examiner

*Primary Examiner*—Benny Quoc Tieu
(74) *Attorney, Agent, or Firm*—Pillsbury Winthrop Shaw Pittman LLP

(57) ABSTRACT

A wireless multi-handset telephone system with integrated video monitoring. A speakerphone base unit, at least one camera module, at least one combination video/voice handset, and at least one voice handset operate together such that voice and data are transmitted (i) between the speakerphone base unit and the at least one camera module and (ii) between the speakerphone base unit and the at least one voice handset, and video images are transmitted from the at least one camera module to the at least one combination video/voice handset.

28 Claims, 5 Drawing Sheets

WIRELESS MULTI-HANDSET TELEPHONE SYSTEM WITH INTEGRATED VIDEO MONITORING ACCESSORIES

This application claims the benefit of U.S. Provisional Application No. 60/437,998, filed Jan. 6, 2003, which is herein incorporated by reference in its entirety.

BACKGROUND

1. Field of the Invention

The present invention is directed to wireless monitoring, and more particularly to a video monitoring system that is, at least in part, integrated with a cordless telephone system.

2. Background of the Invention

Problem to be solved. With a perceived need for increased security and surveillance, many homeowners have installed front door video cameras and/or "nanny cams" in their homes. Examples of known video monitoring systems include:

(1) "CyberEye," which is a device that senses motion and takes a still picture. The picture is then viewed by connecting the device to an external TV monitor or VCR. This system supports only black and white pictures and uses infrared illumination. More information about this product can be found at http://nservices.com/cybereye.htm;

(2) "VisionTech VT12WP" is a 2.4 GHz high power wireless video system including a camera that requires line of sight between the camera and a receiver. This system is more suitable for commercial applications and, in comparison to systems with similar functionality, is very costly. More information about this product can be found at http://www.visiontechintl.com/pdf/vt12wp.pdf; and (3) "TBO-Tech ST-103W" uses a passive motion detector that is wired to a separate 2.4 GHz wireless camera and receiver. The receiver also must be connected to an external TV or VCR to view images. More information about this product can be found at http://www.hiddenpinholecameras.com/motion-detector.htm.

Nokia offers a product that includes a camera that can be programmed to take images automatically at a designated time interval and send the images to a mobile telephone that is multimedia message-enabled and has a color screen. Alternatively, the camera can be configured to send images to an email address from which the images can be viewed. While the Nokia system offers users the ability to remotely monitor images that a camera picks up, the camera in the Nokia system is actually a mobile telephone that sends images over a GSM wireless network. Thus, owners of the Nokia system are required to subscribe to at least one wireless service account for the camera, and if wireless telephone access is desired, a second subscription must be entered into for the user's multimedia message-enabled telephone. The prospect of having to pay for and manage separate wireless service subscriptions is undesirable for most consumers, especially those with lower incomes. More information about this Nokia product can be found at http://www.nokia.com.nokia/0,4879,4654,00.html.

Kador Ltd. offers another in-home imaging system. This system comprises a stand alone digital camera with a built-in modem. The camera takes pictures and sends them over PSTN telephone lines to a computer selected by the user. While simpler in overall architecture compared to the Nokia system just described, the Kador system is severely limited in that the user must have access to a computer that is always connected to the PSTN. More information about this product can be found at http://www.kador.com/remote.htm.

VPON, or Video Picture On Net, is yet another remote image system. VPON is advertised as a plug-&-play remote video camera server that has a built-in mini web server that provides real time video capture and streaming over the internet, an intranet, or direct telephone connection. Like the Kador system, however, the VPON system also requires access to, at the very least, a computer. More information about this product can be found at http://www.vpon21.com/.

There are also a wide variety of home monitoring systems that rely on analog video that is captured by one or more cameras and fed to a transceiver. The transceiver is connected to the PSTN. A similar transceiver is provided at another end of a PSTN connection and is connected to a video monitor, such as a television set. When a call is established between the two transceivers, analog video signals from the cameras are sent over the PSTN and can be monitored remotely. One such system is described at http://www.youdoitsecurity.com/remote-surveillanceequipment.asp.

Still other known monitoring systems are described in U.S. Pat. No. 6,476,858, "Video Monitoring and Security System," and U.S. Pat. No. 6,433,683, "Multipurpose Wireless Video Alarm Device and System."

Despite the availability of a wide variety of video monitoring systems as exemplified by the products and systems mentioned above, there is still a need for improvements in this field of technology.

BRIEF SUMMARY OF THE INVENTION

Embodiments of the present invention integrate a video camera and receiver into a multi-handset wireless/cordless telephone system such that a room or area in view of a camera can be monitored using a familiar cordless telephone set. Applications of these embodiments include, for example, baby monitoring, front door monitoring, and general surveillance.

By integrating a wireless camera unit into a cordless telephony system in accordance with the present invention, it is no longer necessary to purchase separate devices that may be incompatible with each other to achieve desired video monitoring functionality. As described above, many prior art systems require that a camera be connected to an external TV monitor to view images. The present invention, in contrast, permits a user to move throughout a use area (e.g., a home) with a remote handset and still monitor the area under view by the camera.

In addition to the foregoing, embodiments of the present invention provide the possibility of using the cordless phone handset/base as an alarm for sensing motion, using the cordless handset with an integrated camera to view a remote area, and viewing an area without visible light by employing infrared sensitive cameras.

Typical wireless video systems, like those mentioned in the Background section above, transmit analog NTSC or PAL video signals using 900 MHz or 2.4 GHz frequencies. The large bandwidth required to transmit these analog video signals means that lower RF power must be used which, in turn, reduces the range of these systems to several hundred feet. The present invention, in contrast, preferably employs digital video signals that are further compressed to conserve data bandwidth. In preferred implementations, a transmitter only sends the minimum digital video information necessary to be displayed on the cordless handset display. This conservation of data bandwidth reduces the RF channel bandwidth which, in turn, allows higher available RF transmit power levels. Increased power results in increased range of the video link.

Most prior art wireless video links do not support audio and, when they do, it is only in one direction (from the camera to the receiver). Embodiments of the present invention, on the other hand, provide a two-way audio link that makes it possible to support applications such as a video doorbell and baby monitor. The user can thus carry on a conversation with the person at the camera end of the system.

Non-wireless video systems require custom installation of wiring between the transmit and receive units. This is costly and also a nuisance to a home owner. Wireless operation with embodiments of the present invention, on the other hand, provides easy to install components that require no special tools or specialized installer knowledge.

Typically, only wired systems and expensive ($500+) wireless systems allow multiple camera sources to be used. The present invention, however, allows multiple cameras (e.g., 4, 6 or even more) to be used and controlled wirelessly.

The features and attendant advantages of the present invention will be more fully appreciated upon a reading of the following detailed description in conjunction with the accompanying drawings.

DETAILED DESCRIPTION OF THE INVENTION

Figure 1:
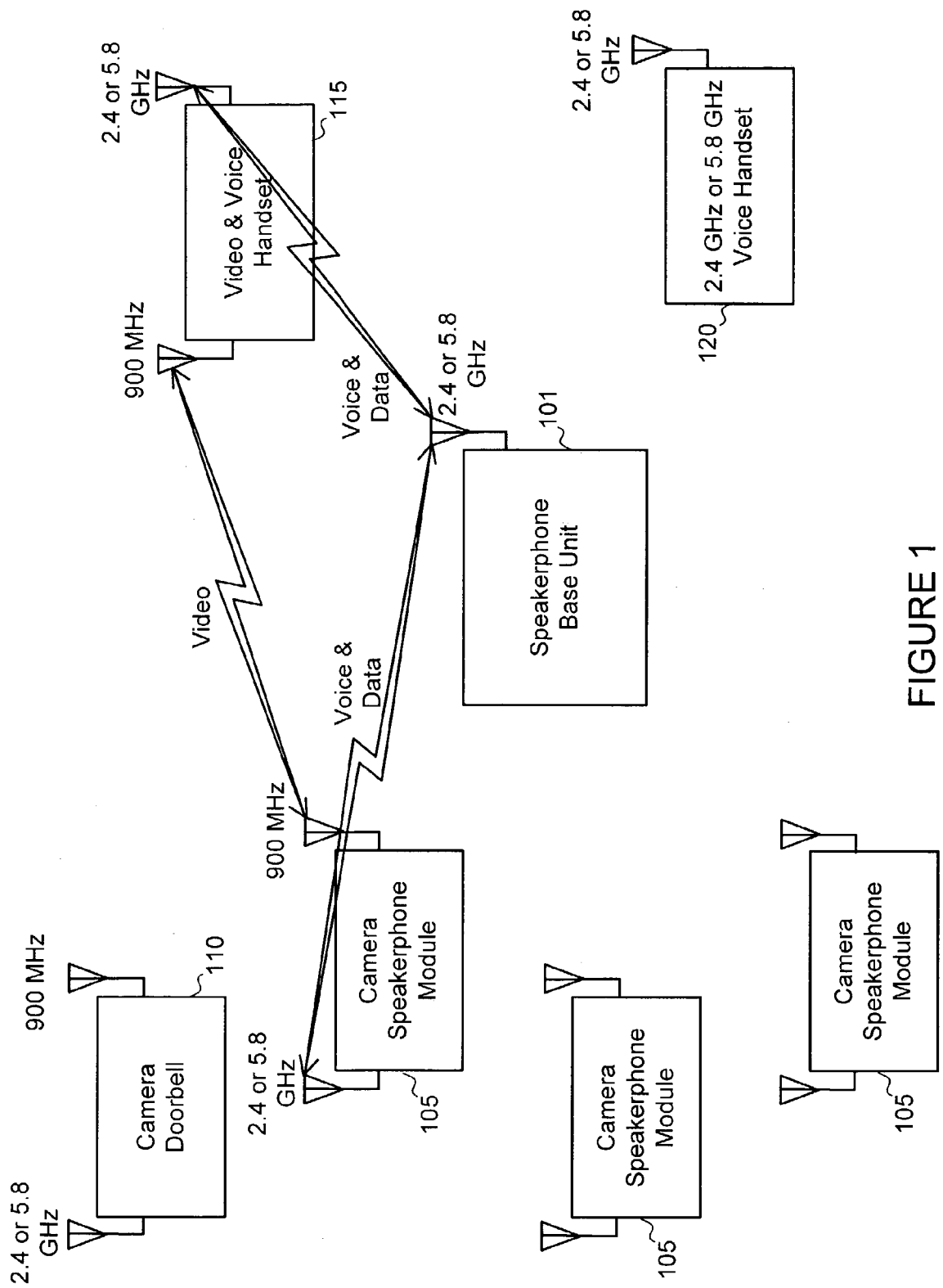
FIG. 1 depicts an exemplary system diagram for a multi handset cordless telephone system with integrated video capabilities in accordance with the present invention.

With reference to FIG. 1, the multi handset cordless telephone system of the present invention preferably includes the following components with described functionality. It should be apparent to those skilled in the art, however, that the following component listing is exemplary only and should not be considered as limiting the scope of the claims appended hereto.

Speakerphone base unit 101 preferably provides wireless voice connection to the PSTN, supports voice intercom calls and caller ID, provides answering machine functions, provides handset charging and provides data communications to handsets/cameras.

Cameral speakerphone module(s) 105 preferably create digital images, compress the digital images, as well as, wirelessly transmit the digital images. This module preferably also supports voice intercom calls using an integrated microphone and speaker, is able to answer incoming calls, provides infrared illumination and is capable of detecting motion.

Camera doorbell module 110 preferably creates digital images, compresses the digital images, and wirelessly transmits digital images. Module 110 preferably also supports voice intercom calls using an integrated microphone and speaker, includes infrared illumination capabilities and motion detection capabilities. Finally, camera doorbell module 110 preferably can cause a "door chime" to be played on remote handset upon detection of motion near a doorway (or any other space/location under view), or upon pressing a doorbell switch.

Video & voice handset 115 preferably supports incoming/outgoing voice calls using an integrated microphone and speaker associated with a telephone line or camera speakerphone module, wirelessly receives digital images, decompresses the received digital images and displays digital images on a display of the handset.

Voice handset 120 preferably supports incoming/outgoing voice calls using an integrated microphone and speaker associated with a telephone line or camera speakerphone module.

SYSTEM DESCRIPTION

A preferred embodiment of the present invention comprises:

One Speakerphone Base unit 101
Multiple Video & Voice Handsets 115
Multiple Voice Handsets 120
Multiple Camera Speakerphone Modules 105
Multiple Camera Doorbell Modules 110

Of course, those skilled in the art will appreciate that different numbers of the foregoing components can be arranged together without departing from the principles of the present invention.

For voice mode operations, well-known standard TDMA (either 2.4 or 5.8 GHz) cordless telephony technology is used. The base unit 101 acts as the master in the voice telephony system and the handsets/camera units 105, 110, 115, 120 are considered slaves. All voice connections are preferably made using the TDMA system including those that accompany a video link. Where a video link is in use, a voice intercom link is preferably simultaneously made using the base. The intercom link preferably also supports data signaling between the video camera and the video handset.

For video mode operations, a digital modulation 900 MHz unidirectional RF link is preferably made between the camera module 105, 110 and the video handset 115 after the initial TDMA voice/data link is established.

Figure 2:
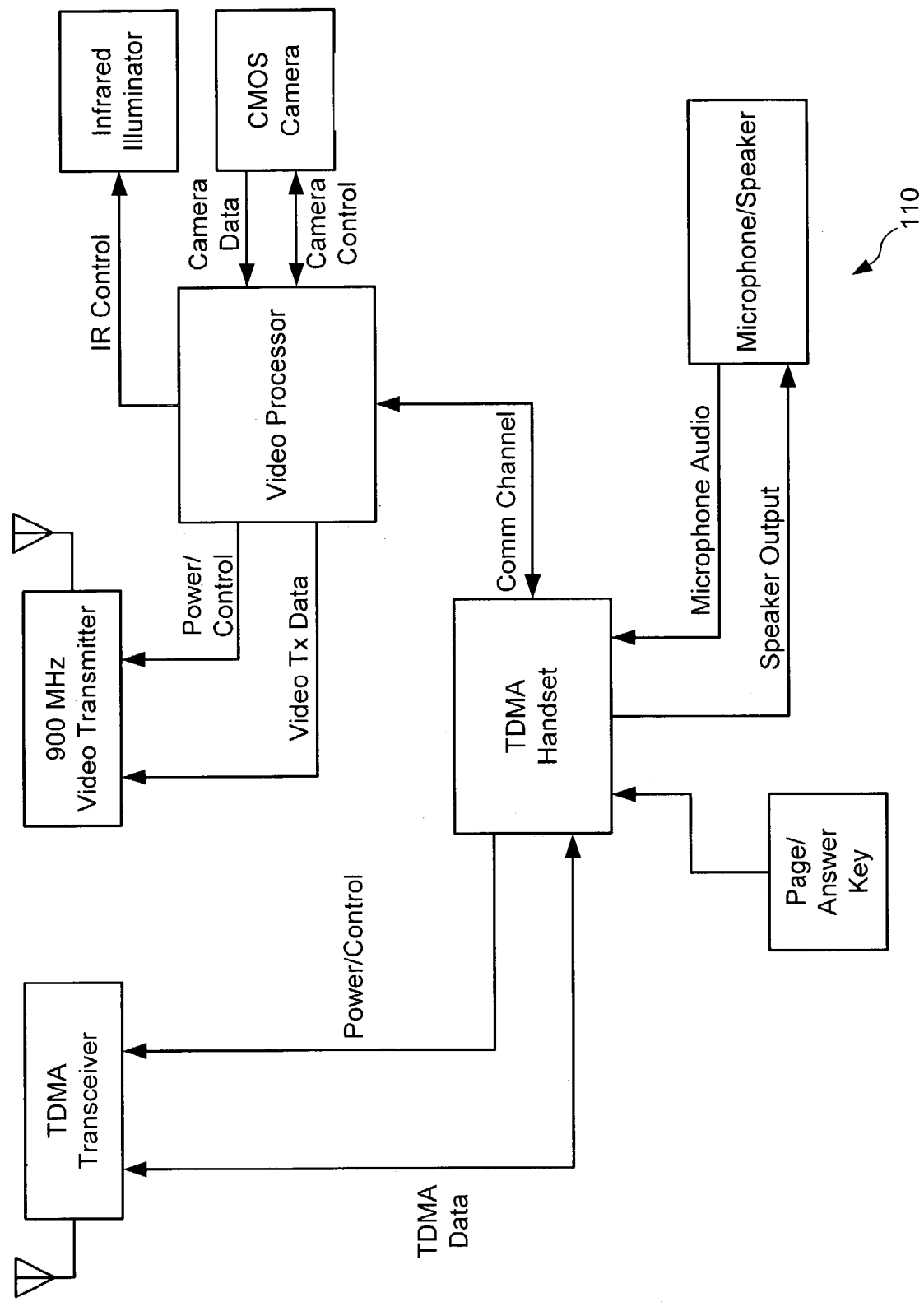
FIG. 2 depicts an exemplary camera and camera doorbell module system diagram in accordance with the present invention.

An infrared illuminator may also be incorporated into the camera speakerphone and camera doorbell modules in order to illuminate the field of view when low or no visible light is present, as shown in FIG. 2.

Exemplary System Operation with Video

A. Doorbell Operation

1. A visitor approaches the door and presses a "Bell" button (not shown) on the camera doorbell unit (CDB) 110. The CDB 110 wakes up upon sensing the press of the button and initiates a voice/data link to the speakerphone base unit (SB) 101. Alternatively, sensed motion is used to trigger subsequent events.

2. The SB 101 signals the handsets 115, 120 that someone has pressed the doorbell button and all voice handsets (H) and video & voice handsets (VH) 115, 120 begin alerting.

3. If a voice only handset (H) 120 or the base (SB) 101 answers the alert, then a two-way voice intercom is made between the CDB 110 and the handset 120 or base 101.

4. If a video handset (VH) 115 answers the alert, then VH 115 sets up a two-way voice intercom link to the CDB 110 using the base unit 101.

4a. The VH 115 then uses the data connection made using TDMA to turn on the video camera on the CDB 110 and begin transmitting the video using the 900 MHz link.

4b. The VH 115 turns on its 900 MHz video receiver and begins displaying the video image.

B. Baby Monitor Operation

1. A baby is sleeping in a room where a camera speakerphone unit (CS) 105 is located.

2. A caregiver wishes to view the baby using the Video Handset 115 and presses a "View" button on the handset.

3. The VH 115 sends a message to the base unit 101 requesting the view command.

4. The base unit 101 creates a silent intercom connection to the CS 105 and tells it to turn on the video camera and begin transmitting the video using the 900 MHz link.

5. The VH 115 turns on its 900 MHz video receiver and begins displaying the video image.

With reference to FIG. 2, a camera unit in accordance with the present invention preferably comprises:

2.4 GHz or 5.8 GHz TDMA RF transceiver
900 MHz digital modulation video transmitter
TDMA handset module
Video Processor
CMOS Camera
Infrared illuminator
Keypad
Microphone and speaker The TDMA RF transceiver receives and transmits digital voice and data using either 2.4 or 5.8 GHz frequency technology. The data received and transmitted by the transceiver is passed to or generated by the TDMA handset module. This module preferably comprises a microprocessor, memory and other analog peripherals necessary to complete a voice telephony call.

The Video portion of the system comprises a digital CMOS imaging camera, a Video Processor, an infrared illuminator and a 900 MHz digital modulation video transmitter.

Images are captured by the CMOS camera module and preferably transferred to the Video processor via a YUV or RGB data interface. Various camera operations such as white balance, exposure, black level, etc. are controlled by the Video processor via a serial interface.

The image data is manipulated by the Video processor into video data packets. These are passed on (Video TX Data) to the 900 MHz digital modulation transmitter. Use of video compression techniques, along with digital processing minimizes the data transmitted. This reduces transmission bandwidth and allows more power to be transmitted resulting in increased range.

Optionally, an infrared illuminator is provided on the camera side to light the area under view with infrared light. This allows the camera to capture images even in the dark. The illuminator preferably comprises an array of IR LEDs that are pulsed on as needed to capture the image.

The Video Processor interfaces to the TDMA handset using the Comm Channel. The Comm Channel is used to communicate with the Video receiver and other peripherals including the TDMA handset.

Figure 3:
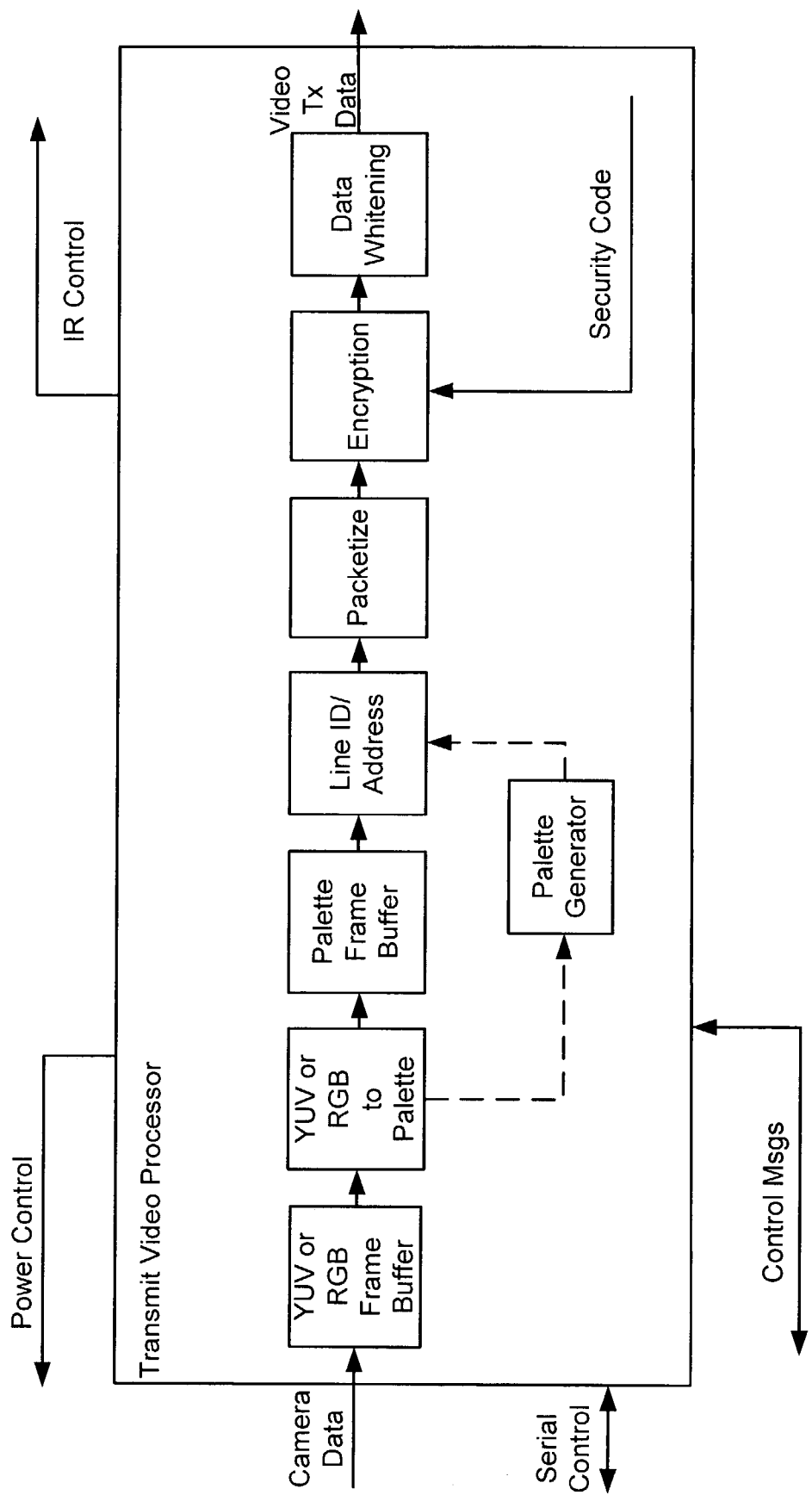
FIG. 3 depicts a block diagram of exemplary camera video processing in accordance with the present invention.

With reference to FIG. 3, image data is transferred from the CMOS (or other image technology) camera in 4:2:2 YUV or RGB format to the YUV or RGB frame buffer in the Video Processor. Each pixel is converted from YUV format 16-bit (65,000 colors) or RGB format 24-but (16M colors) into an 8, 10 or 12 bit value, which means each pixel is converted into one of 256, 1024, or 4096 distinct colors respectively. This process is called palettization and helps to compress the transmitted data. There can be either 256, 1024 or 4096 colors in a palette, based on the number of bits allocated to each pixel.

The palette can be fixed (such as that used in Windows applications) or dynamically generated. Fixed palettes have some limitations in that some fine color details may not be accurately represented due to the limited colors in the palette. Dynamic palettes can render the image much better because custom colors present in the image can be added to the palette. If a dynamic palette is required it can be optionally generated in the Video processor.

The palettized image is saved in another frame buffer prior to transmitting. Each line in the image is read from the palette frame buffer and a line identification number and address is incorporated. The line data is then packetized along with framing information and a cyclic redundancy check (error detection code). This information is preferably scrambled with a security code and randomized with a whitening code in order to make the data appear random. The completed packet is passed on to the transmitter.

Figure 4:
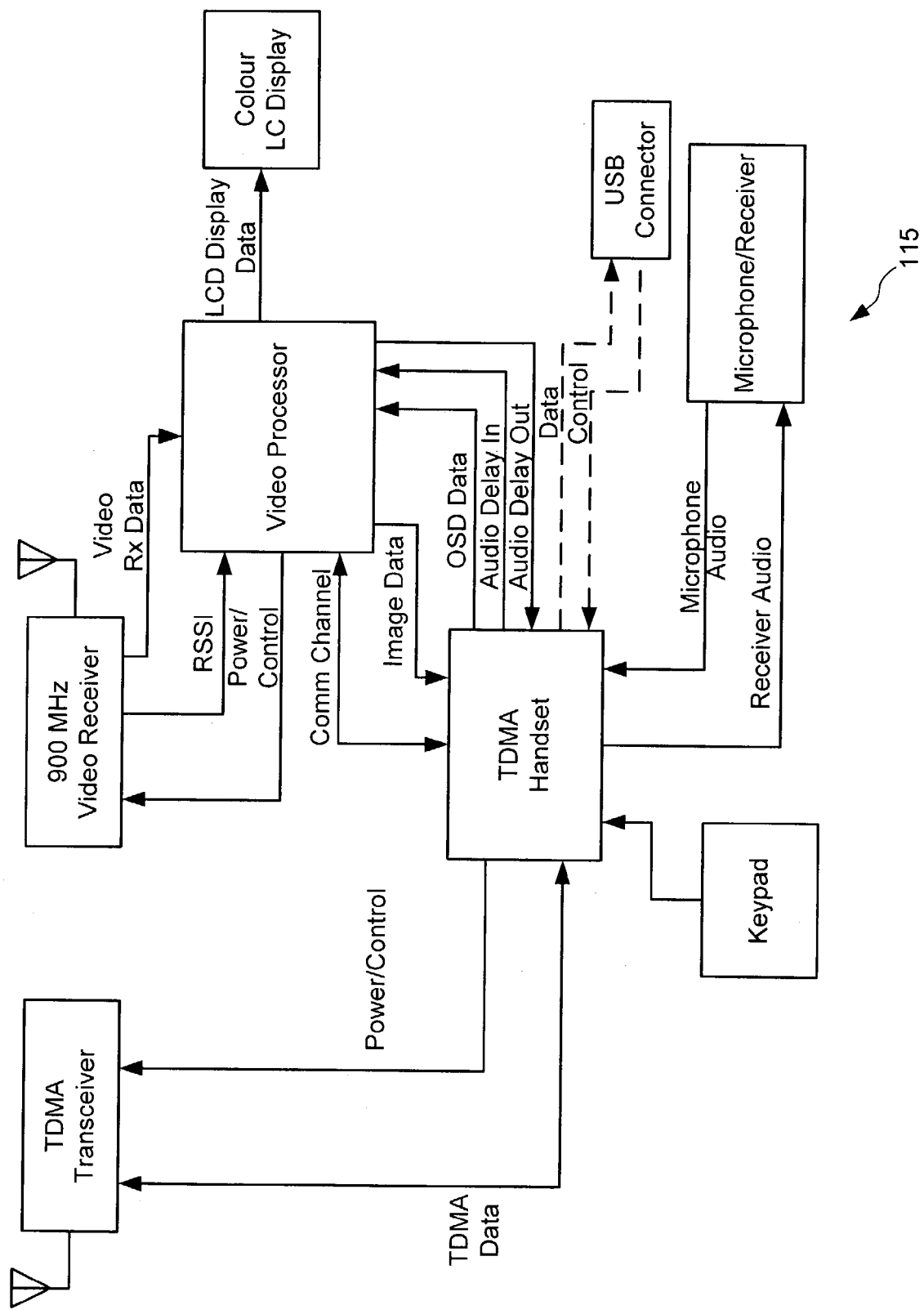
FIG. 4 depicts a block diagram of an exemplary video handset system in accordance with the present invention.

With reference to FIG. 4, The Video Handset unit preferably comprises:

2.4 GHz or 5.8 GHz TDMA RF transceiver
900 MHz digital modulation video receiver
TDMA handset module
Video Processor
Keypad
Microphone and speaker (receiver)

The TDMA RF transceiver receives and transmits digital voice and data using either 2.4 or 5.8 GHz frequency technology. The data received and transmitted by the transceiver is passed to or generated by the TDMA handset module. This module preferably comprises a microprocessor, memory and other analog peripherals necessary to complete a voice telephony call.

The Video portion of the handset system consists of a Video Processor, a 900 MHz digital modulation video receiver and a 120×160 Color LCD display.

The TDMA handset interfaces to the handset Receive Video Processor using the Comm Channel. Control information sent by the Camera module using the TDMA voice/data channel is passed to the Receive Video Processor. The Receive Video Processor can then activate the 900 MHz Digital Modulation video receiver using the Power Control interface. The TDMA handset can also pass graphical and textual information to be included with the video information using an OSD (On Screen Display) Data interface. An Audio Delay In/Out interface is preferably provided to allow TDMA audio to be delayed by the Video Processor in order to maintain audio-video synchronization and to be passed back to the TDMA handset for playback.

Video data from the 900 MHz receiver along with Receive Signal Strength Indication (RSSI) is processed into images that are displayed on the Colour LC Display.

Figure 5:
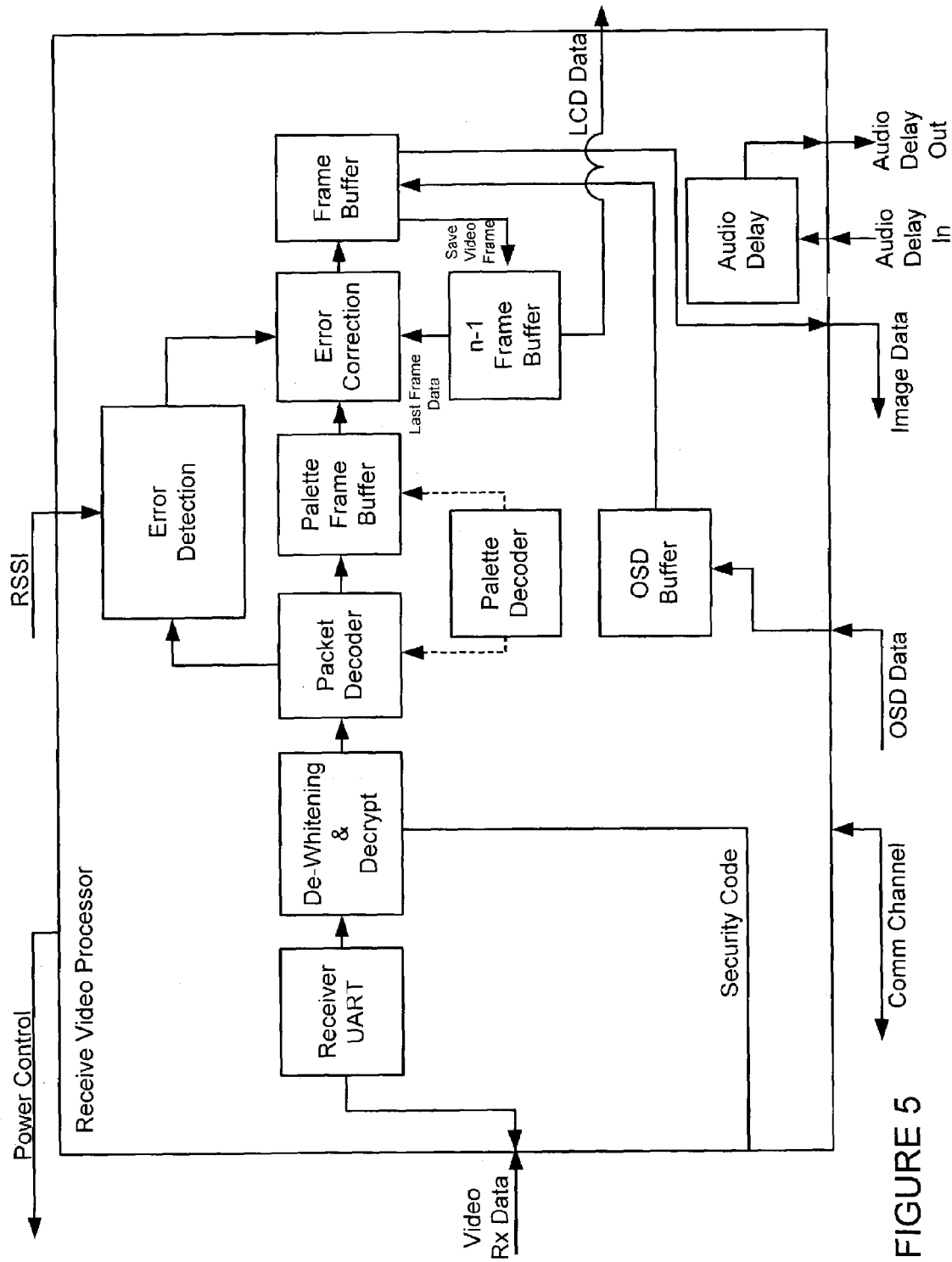
FIG. 5 depicts a block diagram of exemplary handset video processing in accordance with the present invention.

With reference to FIG. 5, The Handset Receive Video Processor accepts the demodulated data from the 900 MHz radio and the data is decoded. The decoded data is de-randomized and de-scrambled and passed into the Packet Decoder to remove the true video data. Each received packet contains the data from one line of video information or it may contain palette information. If the packet contains palette information, this information is passed to the dynamic palette decoder.

The packet decoder also passes information on to the Error Detection module which checks the CRC and the receive signal strength to determine if the received data may have been corrupted. If the Error Detector determines the data is in error, it requests the Error Corrector module to try and fix it.

The palettized information is converted to a colour space format acceptable to the LC Display.

The saved frame of video information in the Pallete Frame buffer is transferred to the Frame Buffer one line at a time. Those lines identified as having errors can be corrected in one of 3 ways:
a) substituting the defective line with the same number line from the previously stored video frame,
b) substituting the defective line with data from the line previous to the defective line, or,
c) substituting the defective line with a new line interpolated from the data on the previous and successive line.

If the TDMA handset has any textual or graphic information to be displayed along with the received video image, it is saved in the OSD Buffer and merged with the corrected video image in the Frame Buffer.

Once the video frame has been rendered along with any graphical or text data, it is transferred to the Last Frame Buffer. The LC Controller interface transfers the data from the Last Frame Buffer to the LC Display. The Last Frame Buffer data is also used in the error correction process.

The Video Processor also preferably includes an Audio Delay module which delays digital audio packets sent by the TDMA Handset in order to provide audio-video synchronization. The delayed audio packets are sent back to the TDMA handset so they can be played back on the handset audio receiver.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A cordless telephone system, comprising:
    a base unit;
    at least one cordless telephone handset that also includes a screen that is capable of displaying images; and
    at least one camera unit that is operable to wirelessly send images to at least the cordless telephone handset,
    wherein audio information associated with the cordless telephone system is transmitted on a first frequency and video information associated with the cordless telephone system is transmitted on a second frequency.

2. The system of claim 1, wherein the camera unit is associated with a doorbell.

3. The system of claim 1, wherein the camera unit comprises a speakerphone.

4. The system of claim 1, wherein the camera unit comprises an infrared illuminator.

5. The system of claim 1, wherein the camera unit comprises means for at least one of transmitting and receiving audio.

6. The system of claim 5, wherein the first frequency is one of 2.4 and 5.8 GHz and the second frequency is 900 MHz.

7. The system of claim 6, wherein transmissions of the audio and video information are synchronized.

8. A video monitoring system, comprising:
    a speakerphone base unit;
    at least one combination video/voice handset;
    at least one voice handset; and
    at least one camera module,
    wherein the base unit is operable to be in wireless communication with any one of the at least one combination video/voice handset, at least one voice handset, and at least one camera module, and wherein the combination video/voice handset is operable to monitor images captured by the at least one camera module,
    wherein audio information associated with the video monitoring system is transmitted on a first frequency and video information associated with the video monitoring system is transmitted on a second frequency.

9. The system of claim 8, wherein the camera module is associated with a doorbell.

10. The system of claim 8, wherein the camera module comprises a speakerphone.

11. The system of claim 8, wherein the camera module comprises an infrared illuminator.

12. The system of claim 8, wherein the first frequency is one of 2.4 and 5.8 GHz and the second frequency is 900 MHz.

13. The system of claim 12, wherein transmissions of the audio and video information are synchronized.

14. The system of claim 8, wherein the camera module comprises a TDMA transceiver and a separate video transmitter.

15. The system of claim 8, wherein the camera module comprises a CMOS camera.

16. The system of claim 8, wherein at least the combination video/voice handset comprises an auxiliary connector.

17. A wireless multi-handset telephone system with integrated video monitoring, comprising:
    a speakerphone base unit;
    at least one camera module;
    at least one combination video/voice handset; and
    at least one voice handset,
    wherein voice and data are transmitted (i) between the speakerphone base unit and the at least one camera module on a first frequency and (ii) between the speakerphone base unit and the at least one voice handset on the first frequency, and video images are transmitted from the at least one camera module to the at least one combination video/voice handset on a second frequency.

18. The system of claim 17, wherein the camera module is associated with a doorbell.

19. The system of claim 17, wherein the camera module comprises a speakerphone.

20. The system of claim 17 wherein the camera module comprises an infrared illuminator.

21. The system of claim 17, wherein the camera module comprises means for at least one of transmitting and receiving audio.

22. The system of claim 21, wherein the first frequency is one of 2.4 and 5.8 GHz and the second frequency is 900 MHz.

23. The system of claim 22, wherein transmissions of the audio and video information are synchronized.

24. A method of monitoring a location using a cordless telephone system, comprising:

initiating a voice and data link between a camera unit having audio capabilities and a base unit on a first frequency;

signaling at least one cordless handset;

establishing a two-way voice intercom between the camera unit and the at least one cordless handset via the base unit using the first frequency;

causing the camera unit to transmit an image on a second frequency; and receiving and displaying the image at the cordless handset using the second frequency.

25. The method claim 24, wherein the first frequency is one of 2.4 and 5.8 GHz and the second frequency is 900 MHz.

26. The method of claim 24, wherein the camera unit transmits the image directly to the cordless handset.

27. The method of claim 24, wherein the cordless handset causes the camera unit to transmit an image.

28. The method of claim 24, wherein the initiating step is responsive to a doorbell being pressed.

* * * * *